Oct. 31, 1944.                J. R. YEADON                 2,361,896
                            WELDING APPARATUS
                           Filed Oct. 25, 1943
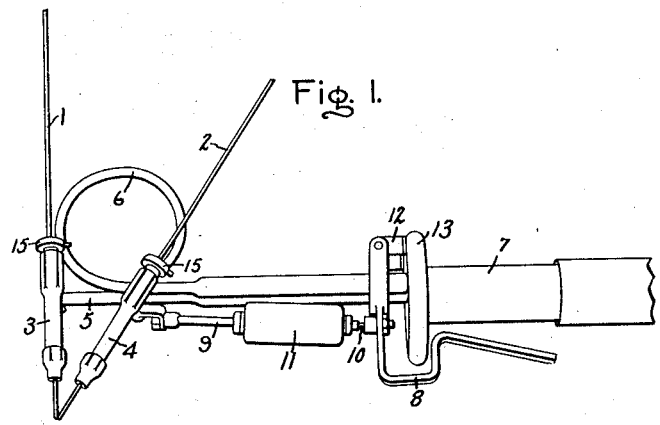
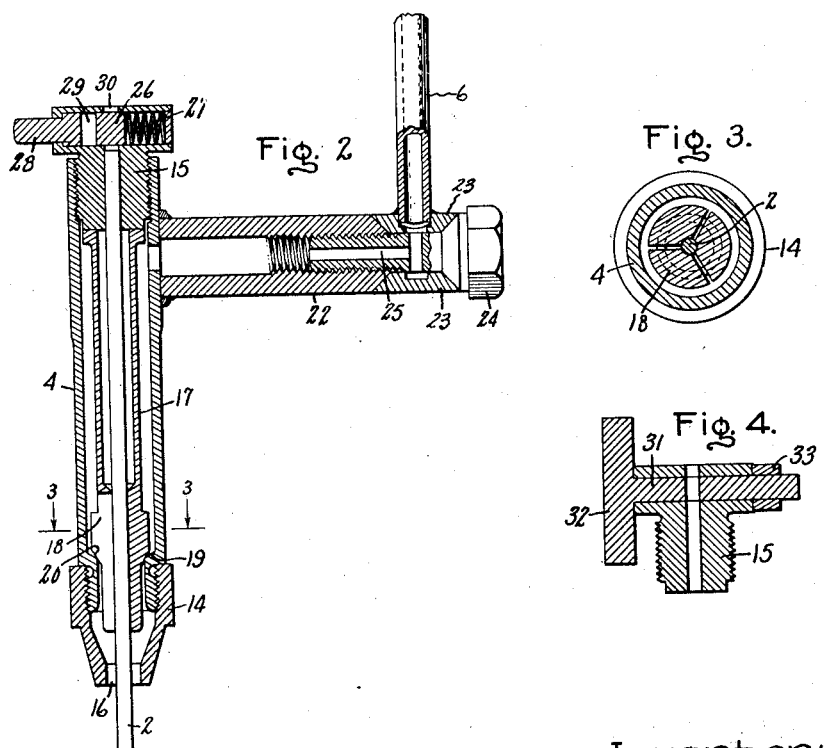
Inventor:
John R. Yeadon,
by Harry E. Dunham
His Attorney.

Patented Oct. 31, 1944

2,361,896

UNITED STATES PATENT OFFICE 2,361,896

WELDING APPARATUS

John R. Yeadon, Lynn, Mass., assignor to General Electric Company, a corporation of New York Application October 25, 1943, Serial No. 507,536

6 Claims. (Cl. 219—14)

My invention relates to welding apparatus and more particularly to a gas-arc welding torch having an electrode holding nozzle of improved construction.

It is an object of my invention to provide a gas-arc welding torch which is suitable for using electrodes which extend through or are contained within its nozzle structure.

It is a further object of my invention to provide an electrode holding gas nozzle in which the escape of gas is confined to its tip portion by valve means which in its open position forms a substantially gas-tight fit about an electrode extending through the nozzle and which in its closed position closes the electrode passageway through the nozzle at a point remote from its tip portion so that the stub end of an electrode in the nozzle may be used until it becomes too short for the electrode holding means in the nozzle.

Further objects of my invention will become apparent from the following description of two embodiments thereof illustrated in the accompanying drawing.

Fig. 1 of this drawing is a side view of an atomic hydrogen torch having an electrode holding nozzle embodying my invention; Fig. 2 is a sectional view of one of the electrode holding nozzles of Fig. 1; Fig. 3 is a sectional view of the nozzle of Fig. 2 along lines 3—3 thereof; and Fig. 4 is a a sectional view of another modification of my invention which has been applied as in Fig. 2 to the thumb-screw of the nozzle structure.

Electrode holding nozzles of gas-arc welding torches are often provided with electrode passageways extending therethrough to their tip portions so that electrodes of greater length than the lengths of the nozzles may be supported therein. The electrode is held in such a nozzle by a clamping mechanism which in accordance with my invention is located adjacent the tip portion of the nozzle through which the arching terminal of the electrode projects. Gas is supplied through the nozzle and its tip portion about the arcing terminal of the electrode during a welding operation. By providing a substantially gas-tight fit between the electrode and the nozzle at that end of the electrode passageway therein which is remote from its tip portion the escape of gas from the nozzle is confined to its tip portion. As the electrode is consumed it is moved through the nozzle so as to position its arcing terminal in substantially a uniform relationship to the nozzle of the torch. Eventually the electrode is consumed until its length is no longer sufficient for closing the opening through which it is introduced into the nozzle and consequently gas supplied to the nozzle will escape through this opening. It has, consequently, been the practice of welding operators to discard stub ends of electrodes when their lengths are but slightly greater than the length of the electrode holding nozzle in which they are supported. This results in an inefficient use of electrode material.

In accordance with my invention I provide an electrode holding gas nozzle with valve means which in its open position forms a substantially gas-tight fit about the electrode extending therethrough and which in its closed position closes the electrode passageway through the nozzle at a point remote from its tip portion so that the stub end of the electrode in the nozzle may be used until it becomes too short for the electrode holding means in the nozzle. Thus in accordance with my invention the electrode holding nozzle of a gas-arc torch is suited to the use of lengths of electrode material which may be as long as desired or of a length less than the length of the nozzle, provided they are still long enough to be engaged and held by the electrode holding means contained within the nozzle. This valve means may be of many forms and may be variously applied to the nozzle structure. As shown in the embodiments illustrated in the accompanying drawing, one of the valve means is biased to a closed position whereas the other is not.

My invention has been illustrated as applied to a torch having a nozzle construction such as that described and claimed in United States Letter Patent 2,014,226, James T. Catlett, granted September 10, 1935, and assigned to the assignee of this invention. When applied to such a construction, the valve means is conveniently located in the thumb-screw forming part of the nozzle structure as shown in Figs. 2 and 4 of the drawing.

In the atomatic hydrogen torch shown in Fig. 1, electrodes 1 and 2 are supported in electrode holding gas nozzles 3 and 4 which are independently supported on tubes 5 and 6 which project from a handle 7. Electrode holding nozzle 4 is connected to a lever 8 by rods 9 and 10 which are connected and electrically insulated from one another by a member 11. Lever 8 is pivoted to a bracket 12 mounted on a guard 13 forming part of handle 7. Movement of lever 8 consequently moves electrode 2 in electrode holding nozzle 4 relative to electrode 1 supported in electrode holding nozzle 3. This limited movement is made possible by providing tube 6 with a looped portion which is sufficiently resilient for this purpose and which also acts as a spring member which tends to hold the electrodes in a predetermined position relative to one another. Electricity and gas are supplied to the arcing terminals of the electrodes in nozzles 3 and 4 through tubes 5 and 6 by means of connections within the end portion of handle 7 which has not been illustrated in the drawing.

In Fig. 2 I have shown a cross-sectional view of the electrode holding nozzle 4 of Fig. 1. The electrode passageway therethrough terminates at one end of the nozzle in a tip 14 and at its other end in a thumb-screw 15. Each of these members make a threaded engagement with the end portions of the nozzle.

Tip 14 forms with the discharge end of nozzle 4 a chamber having a discharge opening 16 greater in size than the electrode supported therein. Electrode 2 is centered in this opening 16 by a collet 17 which is slotted at its lower end to form clamping jaws 18 for the electrode. Nozzle 4 is provided with an internal wedging surface 19 against which an external wedging surface 20 at the jaws 19 of the collet acts to force these jaws into engagement with the electrode extending therethrough when the collet is given a lengthwise movement toward the tip of the nozzle. This movement is imparted to the collet by thumb-screw 15 which acts against the upper end of the collet.

Gas is supplied to the nozzle through an arm 22 which also acts as a support for the nozzle. This arm is attached to a connection 23 at the end of tube 6 of the torch by means of a cap-screw 24 which is provided with a passageway 25 extending from its side wall near its head to its tip within arm 22. The end of arm 22 and the head of cap-screw 24 are provided with opposed clamping surfaces which are adapted to engage the opposite sides of the connection 23 to form an electrical and gas-tight connection between the nozzle and its supporting tube 6 through which gas and electricity are supplied thereto.

It is apparent that the construction of the electrode holding nozzle is such that electricity will be supplied to the electrode supported therein in view of the fact that the various parts are formed of metal and are thus conductors of electricity. Gas is supplied from the passageway through nozzle 4 to the chamber within tip 14 through the slotted end portion of collet 17. The gas thus supplied to the tip 14 is discharged about the electrode 2 and totally encloses its arcing terminal.

In accordance with my invention, valve means mounted on the nozzle and forming a substantially gas-tight fit about an electrode extending therethrough is provided for opening and closing the electrode passageway through the nozzle at a point remote from its tip. With such an arrangement an electrode holding nozzle such as described above becomes suitable for using not only electrodes longer than the nozzle but also for using their stud ends which are shorter than the nozzle, provided of course that these stud ends are long enough to be engaged and held by the electrode holding means contained within or forming a part of the nozzle. By employing an electrode holding means which engages the electrode at a point near the tip of the nozzle these stud ends may be used until they are about one inch long. Without my invention these stub ends would be discarded by most operators when about three or four inches long. Furthermore, my invention makes it possible to use electrodes of a length to be wholly contained in a nozzle so that welding in confined places may be accomplished without the troublesome interference resulting from the end of an electrode projecting through the top of a nozzle.

In the embodiment of my invention shown in Fig. 2 a slide valve 26 located in the head of screw 15 is provided for closing the end of the electrode passageway through nozzle 4 at a point remote from its tip portion 14. This valve is biased to the position illustrated by a spring 27 and may be moved against the bias of this spring by applying pressure to its portion 28 which projects from the head of screw 15. In the position shown it closes the electrode passageway through screw 15 and consequently prevents escape of gas from the nozzle through this passageway when the end of electrode 2 no longer closes it. By applying pressure to valve portion 28 and aligning the passageways 29 and 30 in valve 26 and screw 15, a new length of electrode material may be introduced into the electrode passageway in nozzle 4. If this new length of electrode material is greater than the length of the nozzle it may be suitably clamped in the nozzle with its end projecting therefrom through screw 15 since screw 15 and valve 26 therein forms a substantially gas-tight closure for that end of the electrode passageway in nozzle 4 which is remote from its tip 14.

In another embodiment of my invention illustrated in Fig. 4 I employ a rotary valve 31 mounted in the head of screw 15. This valve is provided at one end with an operating disk or head 32 and is held in place by a collar 33 mounted on its other end and engaging the rim surface of the head portion of screw 15. The electrode passageway through screw 15 may be opened or closed by rotating valve 31 to its open or closed position so that an electrode may be positioned in the nozzle with its end projecting through screw 15 or may be wholly contained within the nozzle so that the passageway through screw 15 would not be closed if valve 31 were not moved to its closed position.

It is apparent that my invention is not limited to the structure of the embodiments illustrated and described above since it may be applied to any electrode holding nozzle for gas-arc torches where the electrode holding means is located in the tip portion of the nozzle and the length of the nozzle structure makes it desirable to close the end of the electrode passageway therethrough which is remote from the nozzle tip so that short length electrodes or stub ends of long electrodes may be fully utilized within the capabilities of the electrode holding means forming part of the nozzle structure.

What I claim as new and desire to secure by Letters Patent of the United States, is:

1. Gas-arc welding apparatus comprising a nozzle having therethrough an electrode passageway, one end of which is located in the tip portion of said nozzle, electrode holding means for engaging an electrode in said passageway of said nozzle at a point near said tip portion of said nozzle, means for supplying gas through said nozzle and its said tip portion about the arcing terminal of an electrode in said electrode holding means, and valve means for opening and closing the other end of said electrode passageway through said nozzle, said valve means in is open position forming a substantially gas-tight fit about an electrode extending through said electrode passageway in said nozzle and in its closed position closing said passageway to prevent the escape of gas therefrom so that the stud end of an electrode in said nozzle may be used until it becomes too short for said electrode holding means therein.

2. Gas-arc welding apparatus comprising a nozzle having therethrough an electrode passageway, one end of which is located in the tip portion of said nozzle, electrode holding means for engaging an electrode in said passageway of said nozzle at a point near said tip portion of said nozzle, means for supplying gas through said nozzle and its said tip portion about the arcing terminal of an electrode in said electrode holding means, means including a member mounted on and movable relatively to said nozzle for opening and closing the other end of said electrode passageway through said nozzle, said means forming a substantially gas-tight fit about an electrode extending therethrough, means for biasing said member to a position which closes said electrode passageway through said nozzle, and means for moving said member against the action of said biasing means.

3. Gas-arc welding apparatus comprising a nozzle having therethrough an electrode passageway, one end of which is located in the tip portion of said nozzle, an electrode centering and clamping sleeve located in said nozzle and having at one end a slotted portion forming jaws which are adjacent said tip portion of said nozzle, cooperating wedging surfaces on the interior of said nozzle near its said tip portion and on the exterior of said sleeve at its said slotted end portion, means forming a substantially gas-tight closure about an electrode extending beyond said nozzle through the other end of said electrode passageway therein, said means including a screw and a valve mounted on said screw and movable relatively thereto for opening and closing an electrode passageway through said screw, and said screw making a threaded engagement with said nozzle and acting against the other end of said sleeve to force said wedging surfaces together and bring said jaws of said sleeve into clamping engagement with an electrode extending through said sleeve, and means for supplying gas through said nozzle and its said tip portion about the arcing terminal of an electrode positioned in said tip portion by said jaws of said sleeve.

4. Gas-arc welding apparatus comprising a nozzle having therethrough an electrode passageway, a tip attached to said nozzle at its discharge end with which it forms a chamber having a discharge opening greater in size than the electrode supported in said nozzle, an electrode centering and clamping sleeve located in said nozzle and having at one end a slotted portion forming jaws extending into said tip, cooperating wedging surfaces on the interior of said nozzle near said tip and on the exterior of said sleeve at its said slotted end portion, a screw making a threaded engagement with said nozzle at the other end of said electrode passageway therethrough and acting against the other end of said sleeve to force said wedging surfaces together and bring said jaws of said sleeve into clamping engagement with an electrode extending through said sleeve, means for supplying gas through said nozzle and said tip about the arcing terminal of an electrode positioned and held in said tip by said jaws of said sleeve, and means including a member mounted on said screw and movable relatively thereto for opening and closing a substantially gas-tight electrode passageway extending through said screw and aligned with the electrode passageways through said nozzle and said sleeve.

5. Gas-arc welding apparatus comprising a nozzle having therethrough an electrode passageway one end of which is located in the tip portion of said nozzle, an electrode centering and clamping sleeve located in said nozzle and having at one end a slotted portion forming jaws which are adjacent said tip portion of said nozzle, cooperating wedging surfaces on the interior of said nozzle near its said tip portion and on the exterior of said sleeve at its said slotted end portion, a screw making a threaded engagement with said nozzle at the other end of said electrode passageway therethrough and acting against the other end of said sleeve to force said wedging surfaces together and bring said jaws of said sleeve into clamping engagement with an electrode extending through said sleeve, means including a member mounted on said screw and movable relatively thereto for opening and closing a substantially gas-tight electrode passageway extending through said screw and aligned with the electrode passageways through said nozzle and said sleeve, means for moving said member to positions opening and closing said electrode passageway through said screw, and means for supplying gas through said nozzle and its said tip portion about the arcing terminal of an electrode positioned in said tip portion by said jaws of said sleeve.

6. Gas-arc welding apparatus comprising a nozzle having therethrough an electrode passageway one end of which is located in the tip portion of said nozzle, an electrode centering and clamping sleeve located in said nozzle and having at one end a slotted portion forming jaws which are adjacent said tip portion of said nozzle, cooperating wedging surfaces on the interior of said nozzle near its said tip portion and on the exterior of said sleeve at its said slotted end portion, a screw making a threaded engagement with said nozzle at the other end of said electrode passageway therethrough and acting against the other end of said sleeve to force said wedging surfaces together and bring said jaws of said sleeve into clamping engagement with an electrode extending through said sleeve, means including a member mounted on said screw and movable relatively thereto for opening and closing a substantially gas-tight electrode passageway extending through said screw and aligned with the electrode passageways through said nozzle and said sleeve, means for biasing said member to a portion closing said electrode passageway through said screw, means for moving said member against the action of said biasing means to open said electrode passageway through said screw for the reception of an electrode of greater length than the electrode passageway in said nozzle, and means for supplying gas through said nozzle and its said tip portion about the arcing terminal of an electrode positioned in said tip portion by said jaws of said sleeve.

JOHN R. YEADON.